United States Patent
Arno et al.

(10) Patent No.: US 7,108,740 B2
(45) Date of Patent: Sep. 19, 2006

(54) FLEXIBLE, INLINE, POINT-OF-USE AIR/GAS FILTER/DRYER

(75) Inventors: Michael J. Arno, 5850 Kraus Rd., Clarence, NY (US) 14031; Daniel Blaszkowiak, Cheektowaga, NY (US)

(73) Assignee: Michael J. Arno, Clarence, NY (US)

( * ) Notice: Subject to any disclaimer, the term of this patent is extended or adjusted under 35 U.S.C. 154(b) by 0 days.

(21) Appl. No.: 10/931,470

(22) Filed: Sep. 1, 2004

(65) Prior Publication Data

US 2005/0199126 A1    Sep. 15, 2005

Related U.S. Application Data

(60) Provisional application No. 60/581,891, filed on Jun. 22, 2004, provisional application No. 60/553,163, filed on Mar. 15, 2004.

(51) Int. Cl.
*B01D 53/26* (2006.01)

(52) U.S. Cl. ............ 96/134; 55/516; 55/DIG. 17

(58) Field of Classification Search .......... 96/108, 96/117.5, 121, 130–140, 149, 151–154; 55/513, 55/516, 519, DIG. 17; 210/282
See application file for complete search history.

(56) References Cited

U.S. PATENT DOCUMENTS

| | | |
|---|---|---|
| 1,681,531 A | 8/1928 | Gannon |
| 1,839,350 A | 1/1932 | Slagel |
| 1,866,659 A | 7/1932 | Litle, Jr. |
| 2,199,258 A | 4/1940 | Gray ................. 210/131 |
| 2,214,925 A | 9/1940 | Gutrie .................. 252/2 |
| 2,273,779 A | 2/1942 | Dickey et al. ........ 183/75 |
| 2,325,657 A | 8/1943 | Burkness ............. 210/134 |
| 2,526,782 A | 10/1950 | Thorpe ................ 183/45 |
| 2,526,938 A | 10/1950 | Davis et al. .......... 252/408 |
| 2,536,274 A | 1/1951 | Gaugler ............... 210/131 |
| 2,554,879 A | 5/1951 | Race, Jr. .............. 183/4.8 |
| 2,558,125 A * | 6/1951 | Cullen ................. 55/433 |
| 2,579,053 A | 12/1951 | Schulstadt ............ 210/131 |
| 2,593,132 A | 4/1952 | Gannon ............... 183/4.8 |
| 2,649,923 A | 8/1953 | Woppman ............ 183/4.8 |
| 2,671,526 A | 3/1954 | Hunt et al. ........... 183/4.8 |
| 2,671,528 A | 3/1954 | Gross .................. 183/49 |
| 2,751,999 A * | 6/1956 | Semon ................. 55/513 |
| 2,845,138 A | 7/1958 | Gageby ............... 183/4.8 |
| 2,987,175 A | 6/1961 | Bottum ................ 206/46 |
| 3,008,540 A * | 11/1961 | Gibson, Jr. ........... 96/121 |
| 3,029,581 A | 4/1962 | Robbins ............... 55/316 |

(Continued)

FOREIGN PATENT DOCUMENTS

| EP | 0042683 | * 12/1981 |
|---|---|---|
| JP | 54-46185 A | * 4/1979 |

OTHER PUBLICATIONS

Viskon-Aire, Camair TS-10 Desiccant Air Dryer, Nov. 1992, 2 pages.

*Primary Examiner*—Frank M. Lawrence
(74) *Attorney, Agent, or Firm*—Walter W. Duft (57) ABSTRACT

A flexible, inline filter/dryer for installation in an air/gas line delivering compressed air or gas to an air/gas-driven tool. The filter/dryer includes a first end connector, a second end connector, and a flexible main body extending between the first and second end connectors. A drying composition, such as desiccant beads, substantially fills the main body and is retained therein by a retaining system that can include one or more filter elements and a plenum-defining spacer element.

31 Claims, 6 Drawing Sheets

U.S. PATENT DOCUMENTS

| | | | | |
|---|---|---|---|---|
| 3,047,993 A | 8/1962 | Robbins | | 55/274 |
| 3,090,490 A | 5/1963 | Yocum | | 210/299 |
| 3,169,112 A | 2/1965 | Nelson | | 210/266 |
| 3,209,917 A | 10/1965 | Yelinek | | 210/484 |
| 3,240,567 A | 3/1966 | Caparreli et al. | | 23/284 |
| 3,246,758 A | 4/1966 | Wagner | | 210/94 |
| 3,308,957 A | * 3/1967 | Klein | | 210/266 |
| 3,358,428 A | * 12/1967 | Mann | | 96/151 |
| 3,415,041 A | 12/1968 | Kraissl, Jr. | | 55/342 |
| 3,464,186 A | 9/1969 | Hankison et al. | | 55/163 |
| 3,479,146 A | 11/1969 | Hochman et al. | | 23/288 |
| 3,681,899 A | 8/1972 | Grote | | 55/503 |
| 3,705,480 A | 12/1972 | Wireman | | 55/275 |
| 3,724,177 A | 4/1973 | Grote | | 55/316 |
| 3,941,573 A | 3/1976 | Chapel | | 55/316 |
| 4,177,049 A | 12/1979 | Haslett, Jr. | | 55/483 |
| 4,303,521 A | * 12/1981 | Lehmann | | 210/282 |
| 4,478,619 A | 10/1984 | Arends et al. | | |
| 4,548,624 A | 10/1985 | Waller | | 55/274 |
| 4,612,026 A | * 9/1986 | Pollara et al. | | 96/117.5 |
| 4,705,543 A | * 11/1987 | Kertzman | | 96/6 |
| 4,741,697 A | * 5/1988 | Herbison | | 433/25 |
| 4,746,338 A | 5/1988 | Williams | | 55/275 |
| 4,770,678 A | 9/1988 | Haslett, Jr. | | 55/179 |
| 4,811,571 A | 3/1989 | Mayer | | 62/474 |
| 4,822,387 A | 4/1989 | Daniels | | 55/323 |
| 5,110,330 A | * 5/1992 | Loughran | | 96/117.5 |
| 5,240,483 A | * 8/1993 | Rosen | | 96/137 |
| 5,350,442 A | 9/1994 | Thelen et al. | | 95/115 |
| 5,427,609 A | 6/1995 | Zoglman et al. | | 95/98 |
| 5,580,451 A | * 12/1996 | Tack | | 210/266 |
| 5,630,855 A | * 5/1997 | Lundback | | 96/405 |
| 5,667,566 A | 9/1997 | Flynn et al. | | 96/138 |
| 5,681,370 A | 10/1997 | McMahon | | 95/105 |
| 5,683,499 A | 11/1997 | Kiyani | | 96/147 |
| 5,746,807 A | 5/1998 | Thelen et al. | | 95/123 |
| 5,846,271 A | 12/1998 | Flynn et al. | | 55/315 |
| 6,309,450 B1 | 10/2001 | Millen et al. | | 96/131 |
| 6,402,811 B1 | * 6/2002 | Shanks et al. | | 95/90 |
| 6,585,173 B1 | 7/2003 | Schmon et al. | | 239/526 |
| 6,835,234 B1 | * 12/2004 | Leffel et al. | | 96/108 |
| 2005/0132887 A1 | 6/2005 | Mitsch et al. | | 96/108 |

\* cited by examiner

FLEXIBLE, INLINE, POINT-OF-USE AIR/GAS FILTER/DRYER

CROSS-REFERENCE TO RELATED APPLICATIONS

This application claims benefit of the filing date of U.S. Provisional Application No. 60/553,163, filed on Mar. 15, 2004, and also claims benefit of the filing date of U.S. Provisional Application No. 60/581,891, filed on Jun. 22, 2004.

BACKGROUND OF THE INVENTION

1. Field of the Invention

The present invention relates to the field of compressed air and gas systems, and more particularly to filtering and drying equipment for filtering and removing moisture from compressed air and gas delivered to air/gas-driven tools.

2. Description of Prior Art

Typical compressed air or gas produced by a compressor apparatus is saturated with 50% to 100% relative humidity, and also contains contaminants such as dirt, dust, oil, line debris and other matter. Filters and traps remove liquid water and other contaminants but do nothing to eliminate the 50% to 100% moisture vapor still remaining in the compressed air or gas. The removal of this moisture vapor requires that an air/gas dryer system be used, such as a refrigerated dryer or an adsorbent type of dryer. Such systems are generally very effective, the latter being typically capable of drying compressed air or gas to below-zero dew point levels. However, even basic dryer systems are relatively expensive, can be difficult to install due to their large and bulky nature, and require regular maintenance to ensure proper operation. Individuals and other entities with limited financial resources, or who do not use compressed air/gas on a regular basis, may elect not to install drying equipment in their compressed air/gas systems, and instead use compressed air or gas that has not been treated to remove moisture vapor. Even if a dryer system is installed, there is no guarantee that the compressed air or gas will have the desired dryness by the time it arrives through an air/gas feed system to a downstream point of use. Compressed air lines, various fitting and regulation devices, or improper operation of the dryer system all represent sources of residual moisture vapor in the air/gas feed system. This means that compressed air or gas that has been moisture-treated may not have the desired dryness characteristics by the time it goes into use as an application. This can cause problems in applications such as paint booth operations where compressed air or gas is used as a propellant to atomize and expel paint from a paint gun. If moisture-laden ambient air is delivered through the air/gas line, it will feed through the paint gun, and may cause unwanted fouling that results in a bad and unacceptable paint job.

It is to solving the foregoing problems that the present invention is directed. What is particularly needed is an improved air/gas dryer that is easy to install and use, simple and inexpensive, and requires no maintenance. The dryer should be suitable for use as the primary or sole air/gas moisture vapor treatment apparatus in a compressed air/gas system, but should also be usable with existing dryer systems. Adding a filtering function to such a dryer would be further desirable.

SUMMARY OF THE INVENTION

The foregoing problems are solved and an advance in the art is achieved by a flexible, inline filter/dryer apparatus for installation in an air/gas line delivering compressed air or gas to an air/gas-driven tool. The filter/dryer includes a first end connector, a second end connector, and a flexible main body extending between the first and second end connectors. A drying composition substantially fills the main body and dries air or gas passing through the device.

In exemplary embodiments of the invention, the main body is elongated, tubular and made from rubber and/or vinyl material to provide the desired flexibility. For most compressed air/gas applications, its length can be about three feet and its inner diameter can be about ¾ inches. This volume can be substantially filled with ¼ inch diameter silica gel desiccant beads without undue pressure drop and with enough drying capacity to paint at least 3–5 automobiles if the filter/dryer is used in a painting application without any other drying equipment in the compressed air/gas system.

In further exemplary embodiments of the invention, a retaining system is provided to retain the drying composition within the main body. The retaining system may include various filter elements and a pair of plenum-defining spacers. The spacers are situated adjacent to the end connectors. The filter elements are situated inwardly from the spacers and can be provided by a pair of outer filter elements and a pair of inner filter elements. The outer filter elements can be implemented using tightly-woven, sheet filter media that wraps around and covers one end of each spacer element. The inner filter elements can be implemented using loosely-woven, pad filter media that are folded or compressed and disposed between the outer filter elements and the drying composition.

In still further exemplary embodiments of the invention, each end connector can be implemented as a two-piece arrangement of a connector fitting and a compression fitting. The connector fitting that has a connector coupling for attachment to a corresponding component in a compressed air/gas line and a barbed hose tail coupling inserted into an end of the main body. The compression fitting mounts over the outside of the main body and is crimped to compress the wall of the main body against the hose tail coupling of the connector fitting.

BRIEF DESCRIPTION OF THE DRAWINGS

The foregoing and other features and advantages of the invention will be apparent from the following more particular description of preferred embodiments of the invention, as illustrated in the accompanying Drawings in which.

DETAILED DESCRIPTION OF EXEMPLARY EMBODIMENTS

Figure 1:
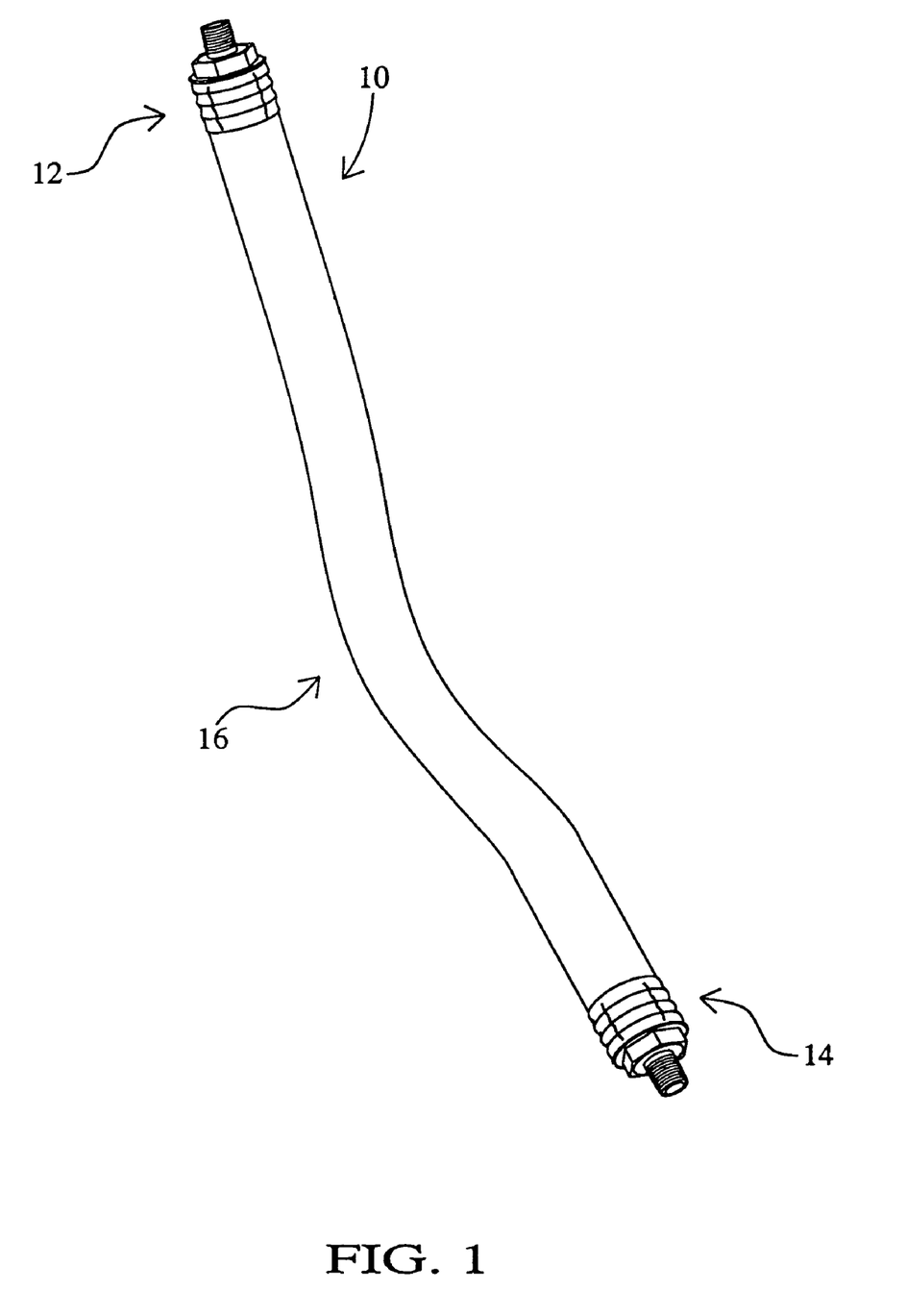
FIG. 1 is a perspective view showing a flexible, inline filter/dryer apparatus constructed in accordance with an exemplary embodiment of the present invention.

Turning now to the drawings wherein like reference numerals indicate like elements in all of the several views, FIG. 1 illustrates a flexible, inline filter/dryer apparatus 10 whose primary visual characteristic is that of an elongated compressed air/gas line hose. There are two end connectors 12 and 14 for installing the filter/dryer 10 into a compressed air/gas line, but the principal feature of interest is the device's flexible, generally tubular, main body assembly 16, which extends between the end connectors. As will be described in more detail below, there is disposed within a substantial portion of the main body assembly 16 a drying composition, such as desiccant beads, for drying the compressed air/gas stream passing through the filter/dryer 10. Retaining elements within the main body assembly 16 are used to retain the drying composition, and additionally provide a filtering function.

Figure 5:
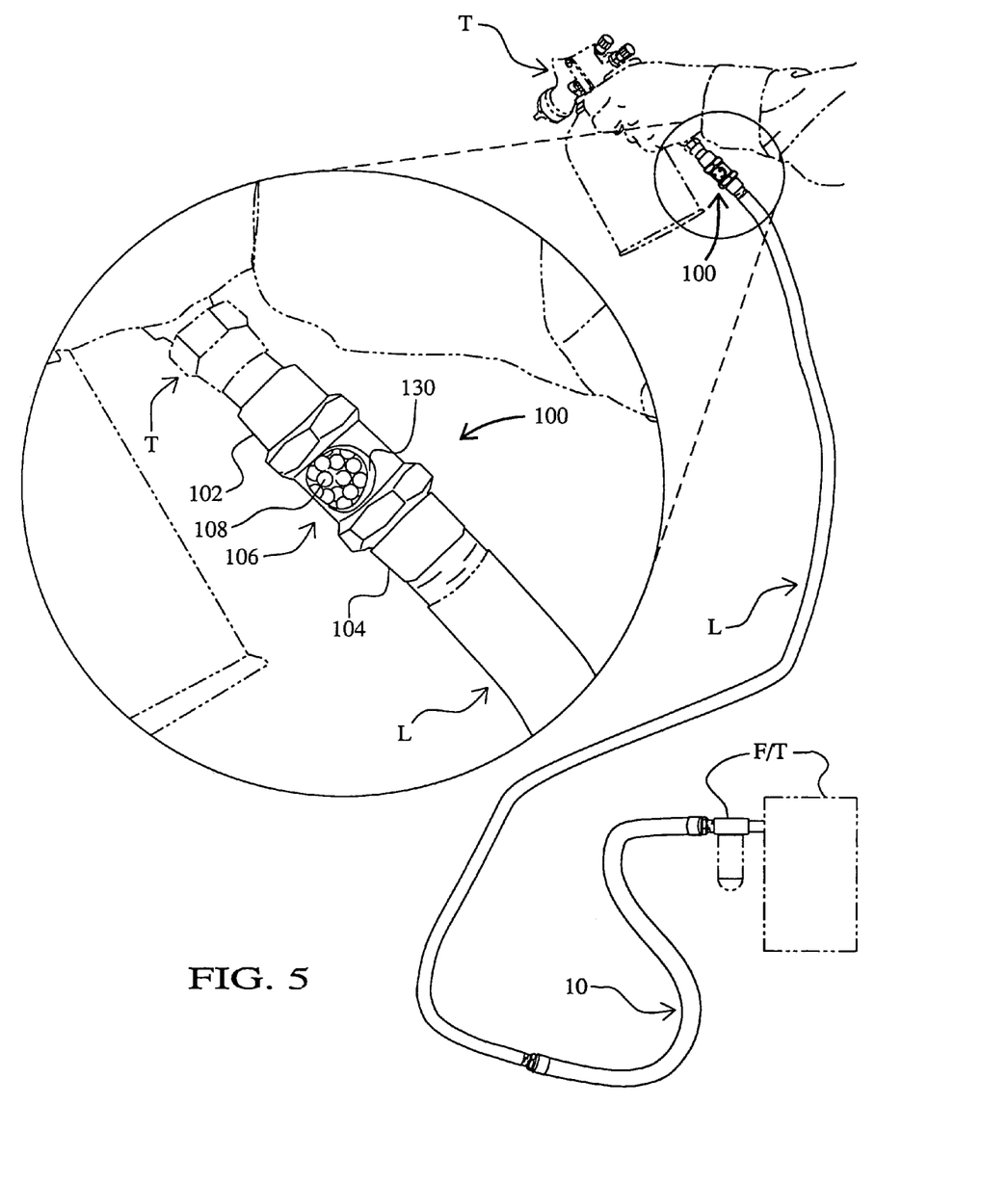
FIG. 5 is a perspective view showing an installation of the filter/dryer apparatus of FIG. 1 between a filter/trap system and a compressed air/gas hose line, and also showing an air/gas-driven tool and an inline, point-of-use dryness indicator, and with an inset showing an enlarged view of the dryness indicator.
Figure 6:
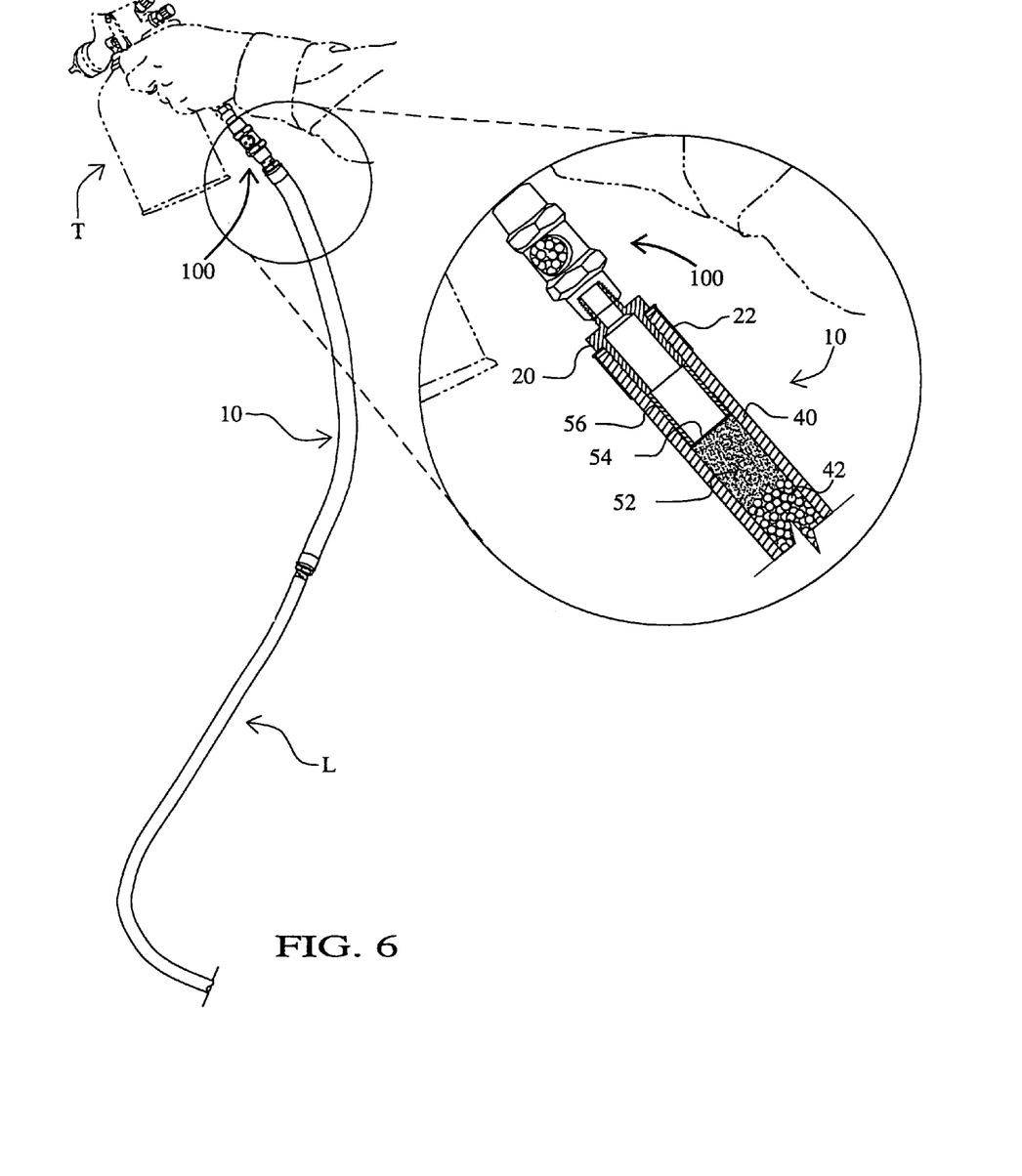
FIG. 6 is a perspective view showing an installation of the filter/dryer apparatus of FIG. 1 between a compressed air/gas hose line and an air/gas-driven tool, and also showing an inline, point-of-use dryness indicator, and with an inset showing an enlarged view of the dryness indicator and an end portion of the filter/dryer.

As shown in FIG. 5, the filter/dryer 10 is ideally suited for installation near a point-of-use, such as between the outlet of a wall-mounted filter and trap system "F/T" and the inlet of a compressed air/gas hose line "L" providing compressed air or gas to an air/gas-driven tool "T," such as a paint gun. Alternatively, as shown in FIG. 6, the filter/dryer 10 could be conveniently installed between the compressed air/gas hose line "L" and the air/gas-driven tool "T." As will become apparent from the further description to follow, the filter/dryer 10 is well suited for installation in the forgoing manner due to its compact and unobtrusive nature, and a flexible, tubular configuration that gives the filter/dryer the look and feel of a compressed air/gas hose extension. Moreover, because the filter/dryer 10 can be made from standard components such as tubing, desiccant beads, filter media, and connector fittings, the apparatus can be made inexpensively enough to be disposable after each reasonable use. For example, when used in a paint booth operation with no other drying equipment being present in the compressed air/gas system, the filter/dryer 10 can be easily last through the painting of 3–5 automobiles before it is discarded.

Figure 2:
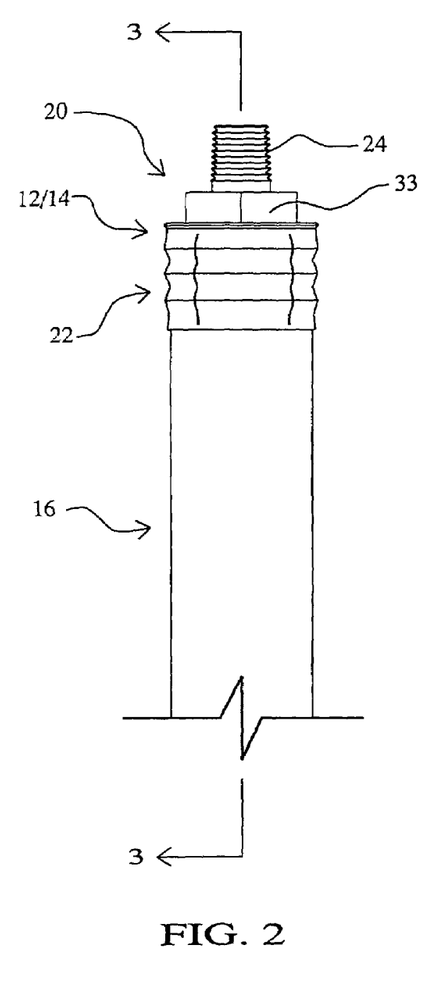
FIG. 2 is an enlarged fragmentary plan view showing one end of the filter/dryer apparatus of FIG. 1.
Figure 3:
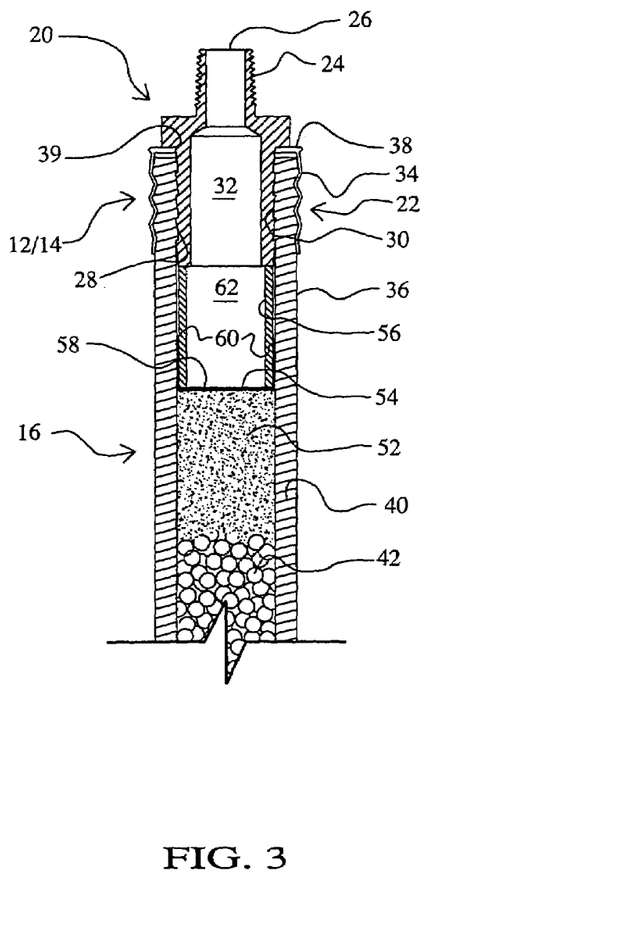
FIG. 3 is a cross-sectional view taken along line 3—3 in FIG. 2.
Figure 4:
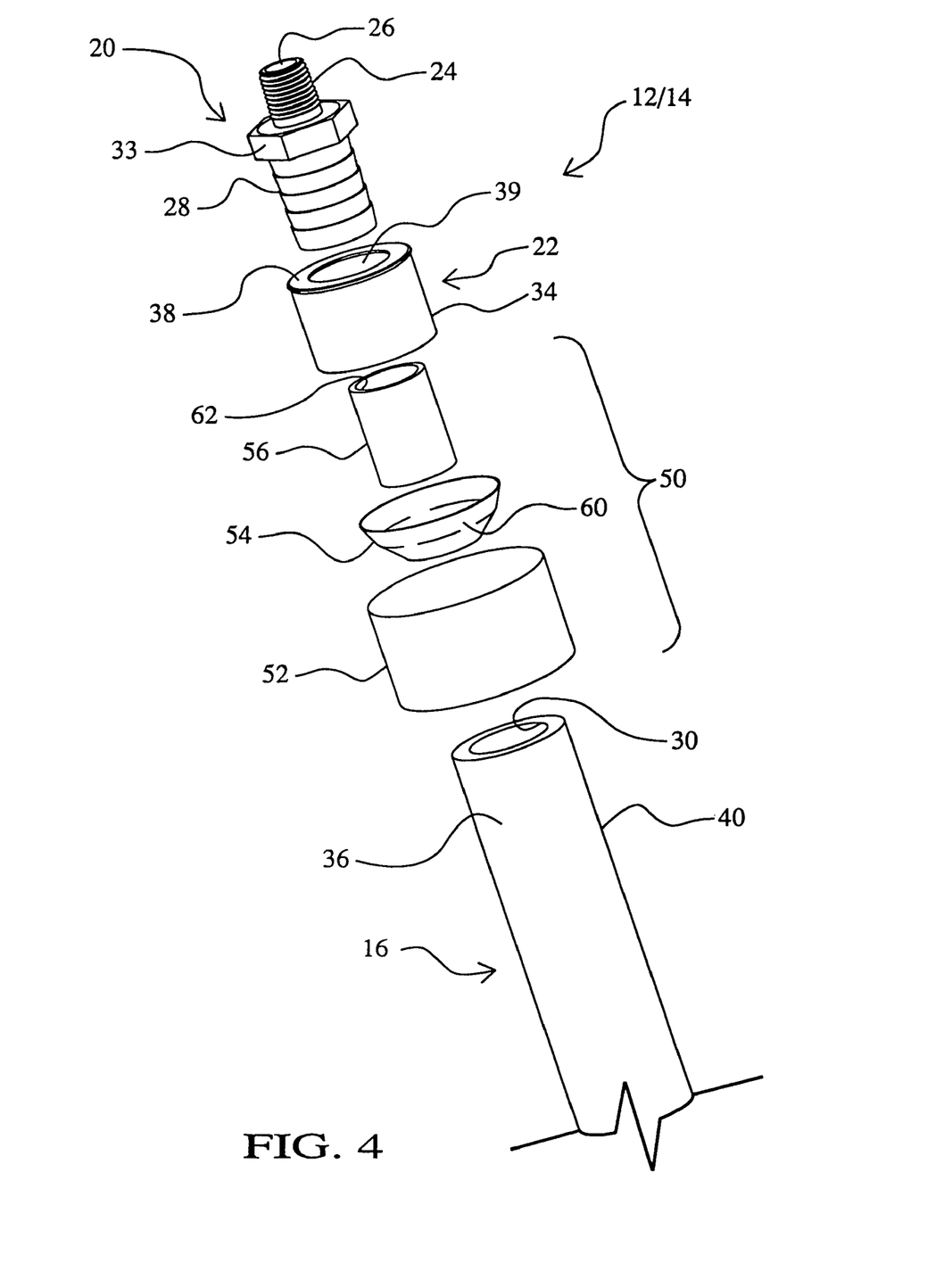
FIG. 4 is an exploded perspective view showing exemplary components that can be installed at each end of the filter/dryer apparatus of FIG. 1.

Turning now to FIGS. 2, 3 and 4, a single representative end of the filter/dryer 10, beginning with an end connector 12/14, is shown. Each end connector 12/14 includes a conventional compressed air/gas line connector fitting 20 and a compression fitting 22. The connector fitting 20 can be made from brass or other metal that is sufficiently rigid and of suitable strength to be safely used in a compressed air/gas application. Each connector fitting 20 includes a threaded connector coupling 24 adapted to threadably engage a corresponding connector of an air/gas-driven tool, an air/gas line, or any other component in a compressed air/gas system to which the filter/dryer 10 will be attached. As described above with reference to FIGS. 5 and 6, such components include the air/gas hose line "L," and the Filter/Trap "F/T." Each connector coupling 24 is shown to have a male thread configuration in the various drawing figures, but it will be appreciated that one or both of the connector couplings could be female-threaded. All such threads preferably comply with NIPT (National Pipe Thread) standards. Extending longitudinally through each connector coupling 24 is a through-bore 26 that passes a compressed air/gas stream to or from the main body 16.

A barbed hose tail coupling 28 on each connector fitting 20 is received at each end of the main body assembly 16, with the barbs of each coupling being snugly burrowed against the main body assembly's inside wall surface 30. A through-bore 32 extends longitudinally within the hose tail coupling 28 and merges with the through-bore 26 of the connector coupling 24. A hexagonal wrench pattern 33 can be formed on the connecting fitting 20 to receive a wrench or other tool for installing the filter/dryer 10 in a compressed air/gas system, as described in more detail below.

The compression fitting 22 can be made from thin brass or other deformable material that can be crimped onto the ends of the main body assembly 16 using a crimping tool. Each compression fitting includes a generally tubular body 34 adapted to slide over the main body assembly's outside wall surface 36. The compressing fitting 22 further includes a shoulder member 38 at one end of the tubular body 34 that engages an end of the main body 16. Each shoulder member 38 has a central opening 39 for receiving one of the hose tail couplings 28.

The crimping tool used to crimp the compression fitting 22 onto main body 16 will distort the tubular body 34 of the compression fitting into a crimped configuration, such as the ribbed configuration shown in the drawing figures. This crimping of the compression fitting 22 by the tool will squeeze the inside wall surface 30 of the main body 16 against the barbs of the hose tail couplings 28, thereby securely retaining the connection fitting 20 onto the end of the main body.

Although not shown, in an alternate embodiment, one or both of the two connector fittings 20 on the filter/dryer 10 can be constructed so that the connector coupling 24 and wrench-receiving portion 33 are allowed to swivel relative to the hose tail coupling 28. This swivel construction allows for smooth rotation of a tool or other component that is mounted to the filter/dryer 10, thus providing additional freedom of movement of such component.

With continuing reference to FIGS. 2, 3 and 4, the main body assembly 16 of the filter/dryer 10 can be formed by a flexible tube 40 of the type conventionally used for compressed air/gas hoses. Such tubing typically comprises two or more plies of rubber and/or vinyl material with reinforcement meshing disposed therebetween to provide strength and safety according to the required operating pressure. As mentioned above, the tube 40 has an inside wall surface 30 and an outside wall surface 36. The size of the tube 40 is selected according the compressed air/gas flow requirements for the application in which the filter/dryer 10 will be used, and the nature and amount of drying composition that is to be carried within the tube. Most air/gas-driven tools, including HVLP (High Volume, Low Pressure) paint guns, require an air/gas flow of between about 5–30 SCFM (Standard Cubic Feet per Minute). For these applications, an inside diameter of about ¾ inches has been found to be adequate for the tube 40, particularly when the drying composition therein comprises 0.18–0.25 inch diameter silica gel desiccant beads (as described in more detail below). It will be appreciated that a larger inside diameter, such as about 1 inch, will accommodate larger air/gas volumes, while a smaller inside diameter, such as ⅝ inches, will require the use of smaller air/gas volumes. The length of the tube 40 must be such as to hold a sufficient quantity of drying composition to perform the required drying function, but must not be so large as to introduce unwanted pressure drop. A tube length of about 3 feet has been found to be adequate for tubes having an inside diameter of ¾ inches. In a compressed air/gas system without any other drying equipment, this tube size has been found to be large enough to accommodate a sufficient charge of 0.18–0.25 inch silica gel desiccant beads to enable at least 3–5 automobiles to be painted before the filter/dryer 10 needs to be replaced.

The tube 40 is substantially filled with a quantity of a drying composition 42 that performs the drying function of the filter/dryer 10, and may also provide a small amount of filtering capability. The drying composition 42 can be selected from any suitable material having the required drying characteristics, including but not limited to (1) moisture adsorbing desiccants such as silica gel beads, activated alumina beads, clays and molecular sieves, and (2) moisture absorbing fibers such as cotton, paper, wood particles or the like. Due to their superior moisture removal properties, silica gel desiccant beads of the type commonly used in compressed air/gas drying systems represent the preferred material used for the drying composition 42. The size of the desiccant beads is selected to minimize unwanted pressure drop within the filter/dryer 10. The average silica gel bead diameter will preferably lie in a range of about 0.18–0.25 inches. It will be appreciated that increasing the diameter of the silica gel beads tends to reduce the resistance to air/gas flow through the filter/dryer 10, thereby reducing pressure drop, but also reduces the amount of effective adsorbing surface area. On the other hand, decreasing the size of the silica gel beads increases the amount of adsorbing surface area, but also increases the resistance to air/gas flow, so as to increase the pressure drop through the filter/dryer 10. The 0.18–0.25 inch silica gel desiccant beads, when carried within the tube 40 configured with a size of ¾ inches interior diameter by 36 inches in length, is capable of delivering a relative humidity of as low as ½% (−40 degree F. dew point) at a flow rate of 20 SCFM, with an inlet pressure of 100 psi and an outlet pressure of 60 psi.

Minimizing pressure drop is an important goal when it is considered that the filter/dryer 10 is primarily intended to be used in compressed air/gas systems that may not have an overabundance of available compressed air/gas delivery capability. For example, compressors producing a maximum pressure of 125 psi with a maximum flow of 5–30 SCFM are common. In a painting application, an HVLP (High Volume Low Pressure) spray gun requires a minimum pressure of 30–40 psi and 5–15 SCFM in order to operate properly. The filter/dryer 10 must be capable of delivering air or gas at the required pressure and flow rate, and every effort must be made to avoid reducing the compressed air/gas output significantly below what is provided to the inlet side of the filter/dryer 10. By virtue of careful selection of the size of the tube 40, and the material used as the drying composition 42, the filter/dryer 10 is able to function as a low-pressure-drop device, while maintaining adequate drying capability.

With continuing reference now to FIGS. 3 and 4, a retaining system 50 comprising a set of retaining elements is provided at each end of the tube 40 in order to retain the drying composition 42 therein. The retaining elements of each retaining system 50 are shown by way of example only to include an inner filter element 52, an outer filter element 54, and a generally tubular, plenum-defining spacer 56. The use of two filter elements is a matter of design choice, and it will be appreciated that any desired number of filters (e.g., one or more) could be used in alternative constructions of the filter/dryer 10. Any suitable filtering media can be used. In the exemplary two-filter embodiment shown in FIGS. 3 and 4, the inner filter element 52 comprises a pad filter made from loosely interwoven fibers. As shown in FIG. 4, the inner filter element 52 has a cylindrical shape prior to installation that is larger in diameter than the inside diameter 30 of the tube 40. This element can be installed by folding or compressing it and then stuffing the filter into the tube 40 until it is positioned for contact with the drying composition 42. The outer filter element 54 comprises a disk-shaped sheet filter made from tightly interwoven fibers. As shown in FIG. 4, the outer filter element 54 has the appearance of a miniature coffee filter prior to installation. This element can be installed by placing it over one end of the spacer 56 so that a central portion 58 of the filter covers the spacer opening, while a peripheral portion 60 of the filter is wrapped around the sides of the spacer. The spacer 56 is then inserted into the tube 40 and positioned so that the outer filter element 54 engages the inner filter element 52.

It will be appreciated that the inner and outer filter elements 52 and 54 perform both a retaining function and a filtering function. Retention is provided by the inner filtering element 52 acting as a cushion to dampen acceleration forces acting on the mass of the drying composition 42. The outer filtering element 54 correspondingly acts as a relatively stiff support for the inner filtering element. The filtering function provided by the inner and outer filter elements 52 and 54 varies depending on whether the filters are at the inlet side or the outlet side of the filter/dryer 10. This, in turn depends on the orientation of the filter/dryer in the compressed air/gas stream (i.e., insofar as the filter/dryer is bi-directional, it can be installed in either of two orientations). At the inlet side, the outer filter element 54 acts as a primary filter for trapping and removing material from the compressed air/gas stream, such as oil, liquid water and particulate debris (e.g., dirt, dust, pipe scale, compressor wear particles, etc.). The inner filter element 52 acts as a secondary filter to collect contaminants that pass through the outer filter element 54, if any. At the outlet side, the inner filter element 52 acts as a first after-filter for trapping contaminants that may be introduced by the drying composition 42, such as desiccant dust. The outer filter element 54 acts as a second after-filter to collect any material that passes through the inner filter element 52, if any.

The final component of the retaining system 50 is the spacer 56. This element is shaped (e.g., as a tube) to define a plenum cavity 62 that extends from an interior end of the through-bore 32 to the outer filter element 54. On the inlet side of the filter/dryer 10, the plenum cavity 62 serves to distribute compressed air or gas across the entire cross-sectional area of the outer filter element 54, and has also been found to dramatically reduce pressure drop through the filter/dryer 10 when compared to constructions that do not include the spacers 52.

As mentioned above, the filter/dryer 10 is well suited for installation near a point-of-use, such as between the filter/trap "F/T" and the air hose line "L" in FIG. 5, or between the air hose line "L" and the air/gas-driven tool "T" in FIG. 6. Although the positioning of the filter/dryer in FIG. 5 is expected to be the most likely installation arrangement, the installation of FIG. 6 is no less viable insofar as the filter/dryer 10 is an elongated flexible device that is simply attached to the end of a conventional compressed air/gas hose line "L," and feels and looks just like more hose. The filter/dryer system 10 does not interfere with or encumber the user at the point-of-use in the compressed air/gas application.

As further shown in FIGS. 5 and 6, the filter/dryer 10 can be advantageously used in combination with an inline, point-of-use, air/gas dryness indicator 100. In both of FIGS. 5 and 6, a first side of the indicator 100 mounts directly to the tool "T." In FIG. 5, the second side of the indicator 100 is mounted to the air/gas hose line "L" that extends to the filter/dryer 10. In FIG. 6, the second side of the indicator 100 is mounted directly to the filter/dryer 10.

The indicator 100 can be constructed in accordance with the disclosure of the above-referenced provisional application Ser. No. 60/553,163, and in copending, commonly-owned regular application Ser. No. 10/193,463. The latter application is entitled "Inline, Point-Of-Use Air/Gas Dryness Indicator" and was filed on even date with the present application. The contents of provisional application Ser. No. 60/553,163 and regular application Ser. No. 10/931,463 are both fully incorporated herein by this reference.

As best shown in the inset of FIG. 5 of the present application, the indicator 100 comprises two end connectors 102 and 104 and an indicator body assembly 106 containing a quantity of color-changing dryness-indicating material 108 that is viewable through a pair of opposing view ports 130 (only one is shown). The end connector 102 is attached to the air/gas-driven tool "T," while the end connector 104 is attached to the air/gas hose line "L." The inset of FIG. 6 shows how the indicator 100 can be similarly attached to the air/gas outlet end of the filter/dryer 10 of the present invention. Both the indicator 100 and the filter/dryer 10 have a low-profile configuration and thus do not interfere with the use of the attached compressed air/gas-driven tool "T."

In either installation (i.e., FIGS. 5 or 6), the indicator 100 will provide a visual indication of the ability of the filter/dryer 10 to further dry the compressed air/gas stream. The dryness-indicating material 108 therein will typically be a cobalt-based color-changing desiccant. This material will have a deep blue color when the air or gas is dry, thus signifying that the filter/dryer 10 is fully functional. When the filter/dryer 10 is spent and the air or gas loses its dryness, the color of the desiccant will change to light pink or clear, thereby indicating that the filter/dryer needs to be replaced.

Figure 7:
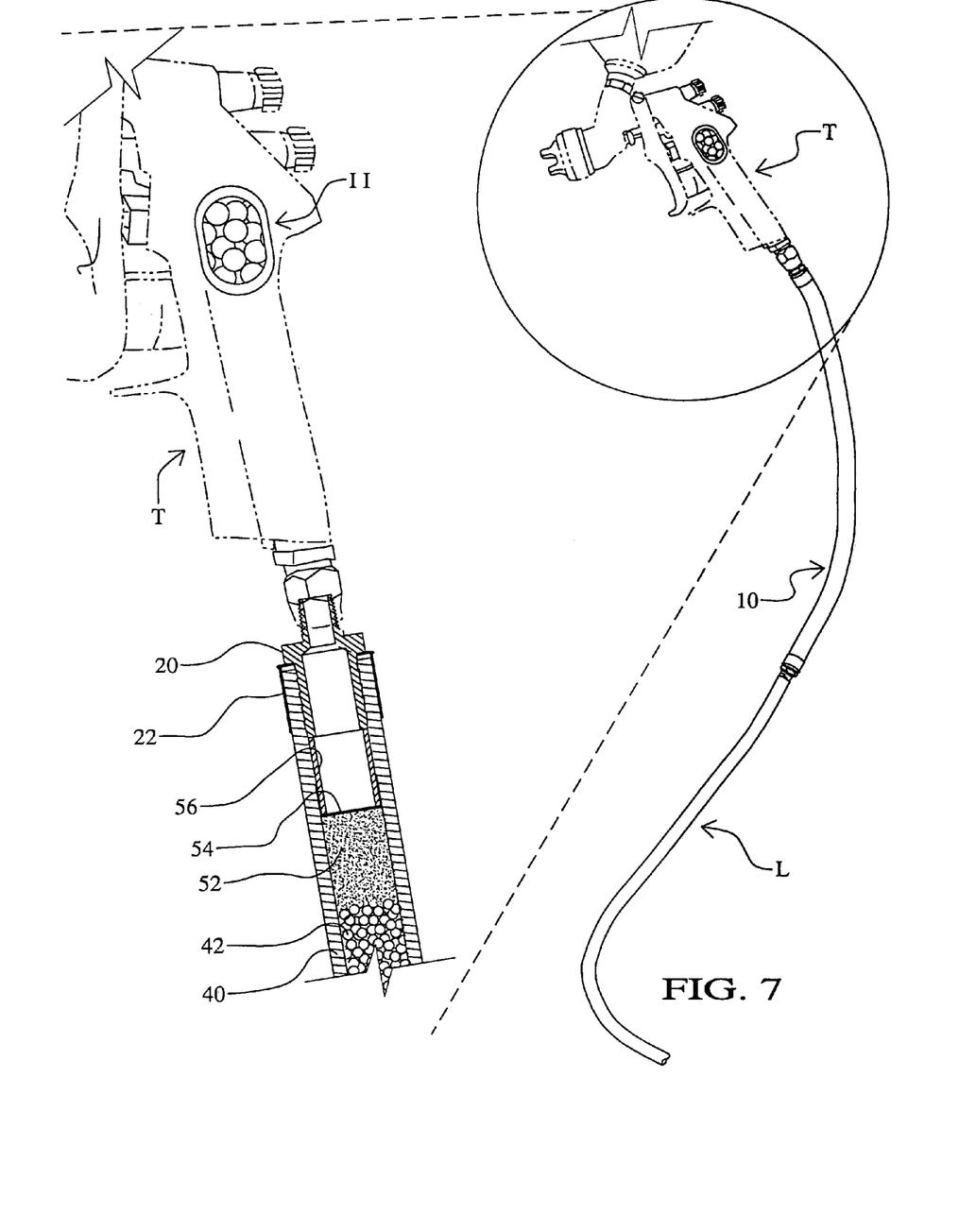
FIG. 7 is a perspective view showing an installation of the filter/dryer apparatus of FIG. 1 between a compressed air/gas hose line and an air/gas-driven tool having an integrated dryness indicator, and with an inset showing an enlarged view of the dryness indicator and an end portion of the filter/dryer.

A further alternative installation for the filter/dryer 10 is shown in FIG. 7. In this installation, the filter/dryer 10 is attached to an air/gas-driven tool "T" having an integrated dryness-indicator "II" situated in the handle thereof. This tool can be constructed in accordance with the disclosure of the above-referenced provisional application Ser. No. 60/581,891, and in copending, commonly-owned regular application Ser. No. 10/931,471. The latter application is entitled "Handheld, Compressed Air/Gas-Driven Tool With Integrated Dryness Indicator" and was filed on even date with the present application. The contents of provisional application Ser. No. 60/581,891 and regular application Ser. No. 10/931,471 are both fully incorporated herein by this reference.

In the installation of FIG. 7, the integrated indicator "II" will provide a visual indication of the ability of the filter/dryer 10 to further dry the compressed air/gas stream. As in the case of the indicator 100 of FIGS. 5 and 6, if the dryness-indicating material within the integrated indicator "II" is a cobalt-salt based color-changing desiccant, the desiccant will have a deep blue color when the filter/dryer 10 is fully functional. When the filter/dryer 10 is spent, the color of the desiccant will change to light pink, thereby indicating that the filter/dryer needs to be replaced.

Accordingly, a flexible, inline, point-of-use air/gas filter/dryer has been disclosed for effectively delivering dry and filtered air or gas to a compressed air/gas application. It will be seen from the various drawing figures the filter/dryer 10 has a flexible, elongated tubular configuration that gives the filter/dryer the look and feel of a compressed air/gas hose extension, and includes the usual connector fittings for attachment to existing compressed air/gas system components. The filter/dryer 10 can be constructed inexpensively enough to be disposable after each reasonable use. When the filter/dryer 10 is spent (as could be definitively indicated by the indicator 100 attached thereto), the user would simply momentarily suspend the compressed air/gas application, and replace the spent filter/dryer with a new one before continuing operations. The exchange of one filter/dryer 10 for another takes only moments of time. The old (spent) filter/dryer 10 can simply be discarded. There is no messy desiccant replacement, no appreciable down-time, no high skill training and no high cost maintenance involved in the use of the filter/dryer 10. The fact that the filter/dryer 10 is bi-directional further simplifies its installation.

It should, of course, be understood that the description and the drawings herein are merely illustrative, and it will be apparent that various modifications, combinations and changes can be made in accordance with the invention. Moreover, although the disclosed filter/dryer has been shown in combination with a paint gun, other air/gas-driven tools, such as drills, screw drivers, staplers, nailers, die grinders, chisels, impact wrenches and ratchets, sand blasters and sanders, as well as inflation (e.g., tires) devices, could be used with a dryness indicator constructed in accordance with the invention. As such, the invention is not to be in any way limited except in accordance with the spirit of the appended claims and their equivalents.

What is claimed is:

1. A flexible, inline filter/dryer for installation in an air/gas line delivering compressed air or gas to an air/gas-driven tool, comprising:
   a first end connector;
   a second end connector;
   a flexible main body extending between said first and second end connectors;
   a reinforced multiple-ply wall on said main body having sufficient strength to safely contain compressed air or gas within said main body at a required operating pressure; and
   a drying composition substantially filling said main body.

2. An apparatus according to claim 1, wherein said main body is elongated.

3. An apparatus according to claim 1, wherein said main body comprises a tube.

4. An apparatus according to claim 1, wherein said main body comprises a tube comprising one or both of rubber and vinyl material.

5. An apparatus according to claim 1, wherein said main body has a length of about three feet.

6. An apparatus according to claim 5, wherein said main body has an inside diameter of about ¾ inches.

7. An apparatus according to claim 1, wherein said drying composition comprises a desiccant.

8. An apparatus according to claim 6, wherein said drying composition comprises silica gel desiccant beads having an average diameter of about 0.18–0.25 inches.

9. An apparatus according to claim 1, further comprising a retaining system for retaining said drying composition in said main body.

10. An apparatus according to claim 9, wherein said retaining system comprises a filter element disposed at each end of said main body.

11. An apparatus according to claim 9, wherein said retaining system comprises an inner filter element and an outer filter element at each end of said main body.

12. An apparatus according to claim 11, wherein said inner filter element comprises a loosely woven pad filter.

13. An apparatus according to claim 11, wherein said outer filter element comprises a tightly woven sheet filter.

14. An apparatus according to claim 9, wherein said retaining system comprises a plenum-defining spacer.

15. An apparatus according to claim 14, wherein said spacer is generally tubular.

16. A flexible, inline filter/dryer for installation in an air/gas line delivering compressed air or gas to an air/gas-driven tool, comprising:
   an elongated flexible tube;
   a reinforced multiple-ply wall on said tube having sufficient strength to safely contain compressed air or gas within said main body at a required operating pressure;
   a first connector mounted on a first end of said tube;
   a second connector mounted on a second end of said tube; and
   a drying composition substantially filling said tube.

17. An apparatus according to claim 16, wherein said first and second connectors each comprise a connector fitting engaging said tube.

18. An apparatus according to claim 17, wherein said first and second connectors each further comprise a compression fitting securing said connector fitting to said tube.

19. An apparatus according to claim 16, wherein said tube comprises one or both of rubber and vinyl material.

20. An apparatus according to claim 16, wherein said tube has a length of about three feet.

21. An apparatus according to claim 20, wherein said tube has an inside diameter of about ¾ inches.

22. An apparatus according to claim 16, wherein said drying composition comprises a desiccant.

23. An apparatus according to claim 21, wherein said drying composition comprises silica gel desiccant beads having an average diameter of about 0.18–0.25 inches.

24. An apparatus according to claim 16 further comprising a retaining system for retaining said drying composition in said tube.

25. An apparatus according to claim 24, wherein said retaining system comprises a filter element disposed at each end of said tube.

26. An apparatus according to claim 25, wherein said retaining system comprises an inner filter element and an outer filter element at each end of said tube.

27. An apparatus according to claim 26, wherein said inner filter element comprises a loosely woven pad filter that is compressed in said tube.

28. An apparatus according to claim 27, wherein said outer filter element comprises a tightly woven sheet filter.

29. An apparatus according to claim 28, wherein said retaining system comprises an open-ended plenum-defining spacer and wherein said outer filter element covers an inner end of said spacer and wraps around side portions of said spacer.

30. An apparatus according to claim 29, wherein said spacer is generally tubular.

31. A flexible, inline filter/dryer for installation in an air/gas line delivering compressed air or gas to an air/gas-driven tool, comprising:
   an elongated flexible tube comprising one or both of rubber and vinyl material having a length of about three feet and an inside diameter of about ¾ inches;
   first and second end connectors respectively mounted on first and second ends of said tube, each of said connectors comprising a connector fitting having a connector coupling, a hose tail coupling and a wrench-receiving portion, and a compressing fitting securing said connector fitting to said tube;
   a quantity of silica gel desiccant beads substantially filling said tube, said desiccant beads having an average diameter of about 0.18–0.25 inches;
   a pair of loosely-woven inner pad filter elements disposed in a folded or compressed state at each end of said tube in contacting relationship with said desiccant beads;
   a pair of tightly-woven outer sheet filter elements disposed adjacent to said inner filter elements;
   a pair of substantially tubular spacer elements disposed between said outer filter elements and said hose tail couplings of said connector fittings; and said outer filter elements covering inner end openings of said spacer elements and wrapping around side portions of said spacer elements.

* * * * *